US010962121B2

(12) United States Patent
Fee et al.

(10) Patent No.: US 10,962,121 B2
(45) Date of Patent: Mar. 30, 2021

(54) GATE VALVE SEALING RING FLOW GUIDE

(71) Applicant: Perimeter Solutions LP, Clayton, MO (US)

(72) Inventors: Darrell Clark Fee, Chesterfield, MO (US); Robert J. Dodson, Jr., Webster Groves, MO (US); Frank H. Parker, Jr., Granite City, IL (US)

(73) Assignee: Perimeter Solutions LP, Clayton, MO (US)

( * ) Notice: Subject to any disclaimer, the term of this patent is extended or adjusted under 35 U.S.C. 154(b) by 0 days.

(21) Appl. No.: 16/278,558

(22) Filed: Feb. 18, 2019

(65) Prior Publication Data

US 2020/0200281 A1 Jun. 25, 2020

Related U.S. Application Data

(60) Provisional application No. 62/783,291, filed on Dec. 21, 2018.

(51) Int. Cl.
| F16K 3/12 | (2006.01) |
| F16K 3/02 | (2006.01) |
| F16J 15/02 | (2006.01) |
| F16J 15/00 | (2006.01) |
| F16K 3/16 | (2006.01) |

(52) U.S. Cl.
CPC .............. *F16K 3/12* (2013.01); *F16J 15/002* (2013.01); *F16J 15/021* (2013.01); *F16K 3/0227* (2013.01); *F16K 3/0281* (2013.01); *F16K 3/02* (2013.01); *F16K 3/16* (2013.01)

(58) Field of Classification Search
CPC . F16K 3/12; F16K 3/0281; F16K 3/16; F16K 3/02; F16K 3/0227; F16J 15/021; F16J 15/002
See application file for complete search history.

(56) References Cited

U.S. PATENT DOCUMENTS

| 2,001,271 | A | * | 5/1935 | Smith | F16K 3/30 |
| | | | | | 137/244 |
| 2,670,172 | A | | 2/1954 | Moore et al. | |
| 2,732,170 | A | * | 1/1956 | Shand | F16K 3/0281 |
| | | | | | 251/172 |
| 2,985,422 | A | * | 5/1961 | Anderson | F16K 3/0227 |
| | | | | | 251/172 |
| 3,040,773 | A | * | 6/1962 | McInerney | F16K 3/14 |
| | | | | | 137/556.3 |
| 3,136,330 | A | * | 6/1964 | Dowling | F16K 27/047 |
| | | | | | 137/340 |
| 3,204,970 | A | * | 9/1965 | Dickinson | F16K 3/12 |
| | | | | | 277/530 |

(Continued)

OTHER PUBLICATIONS

International Search Report dated Feb. 21, 2020 relating to PCT Application No. PCT/US2019/067752, 3 pages.

*Primary Examiner* — Matthew W Jellett
*Assistant Examiner* — Christopher D Ballman
(74) *Attorney, Agent, or Firm* — Stinson LLP

(57) ABSTRACT

A valve and associated components and methods, and a container including such a valve. The valve can include a flow guide to guide flow of material away from a sealing engagement between sealing members of the valve. The flow guide assists in preventing ingress of material between the sealing members to maintain proper function of the valve.

23 Claims, 6 Drawing Sheets

(56) References Cited

U.S. PATENT DOCUMENTS

| | | | |
|---|---|---|---|
| 3,349,789 A | 10/1967 | Crain et al. | |
| 3,871,615 A * | 3/1975 | Donner | F16K 3/12 |
| | | | 251/129.19 |
| 3,976,279 A | 8/1976 | Walker | |
| 4,044,997 A | 8/1977 | Schelat | |
| 4,257,447 A * | 3/1981 | Clarkson | F16K 3/316 |
| | | | 137/375 |
| 4,491,144 A * | 1/1985 | Dreyer | F16K 3/0281 |
| | | | 126/285 A |
| 4,660,805 A * | 4/1987 | Hahn | F16K 3/0227 |
| | | | 251/326 |
| 4,703,915 A | 11/1987 | King | |
| 4,846,442 A * | 7/1989 | Clarkson | F16K 3/0227 |
| | | | 251/328 |
| 4,895,181 A * | 1/1990 | McKavanagh | F16K 3/0281 |
| | | | 137/375 |
| 5,014,730 A * | 5/1991 | Fye | F16K 3/0227 |
| | | | 137/454.2 |
| 5,020,776 A * | 6/1991 | Owens | F16K 3/0227 |
| | | | 251/327 |
| 5,271,426 A * | 12/1993 | Clarkson | F16K 3/0281 |
| | | | 137/375 |
| 5,338,006 A | 8/1994 | McCutcheon et al. | |
| 5,370,149 A * | 12/1994 | Clarkson | F16K 3/0281 |
| | | | 137/375 |
| 5,560,587 A | 10/1996 | McCutcheon et al. | |
| 5,653,423 A | 8/1997 | Young et al. | |
| 5,979,874 A | 11/1999 | Gambetta et al. | |
| 5,983,743 A | 11/1999 | McGregor et al. | |
| 6,007,120 A | 12/1999 | Vogt et al. | |
| 7,523,916 B2 | 4/2009 | Fenton | |
| 8,016,265 B2 * | 9/2011 | Weide | F16L 29/00 |
| | | | 251/328 |
| 8,220,778 B2 * | 7/2012 | Langmesser | F16K 3/0281 |
| | | | 251/328 |
| 8,327,870 B2 * | 12/2012 | Sidler | F16K 3/0227 |
| | | | 137/242 |
| 8,397,386 B2 * | 3/2013 | Weide | F16L 55/105 |
| | | | 29/890.127 |
| 8,403,298 B2 * | 3/2013 | Nguyen | F16K 3/0227 |
| | | | 251/327 |
| 8,690,121 B2 | 4/2014 | Olvera et al. | |
| 9,145,979 B2 | 9/2015 | Hoang | |
| 9,188,231 B2 * | 11/2015 | Nguyen | F16K 3/06 |
| 9,500,294 B2 | 11/2016 | Herman et al. | |
| 10,167,961 B2 * | 1/2019 | Nguyen | F16K 3/0227 |
| 10,274,089 B2 * | 4/2019 | Nguyen | F16K 3/0227 |
| 2002/0130289 A1 * | 9/2002 | Knobbe | F16K 3/16 |
| | | | 251/172 |
| 2013/0263954 A1 | 10/2013 | McBride | |
| 2014/0021397 A1 * | 1/2014 | Painter | F16K 3/0227 |
| | | | 251/328 |
| 2016/0186877 A1 | 6/2016 | Hopper | |
| 2016/0312905 A1 | 10/2016 | Gradle | |

* cited by examiner

GATE VALVE SEALING RING FLOW GUIDE

CROSS-REFERENCE TO RELATED APPLICATION

This application claims priority to U.S. Provisional Patent Application No. 62/783,291 filed on Dec. 21, 2018, the disclosure of which is incorporated herein by reference in its entirety.

FIELD

The present disclosure generally relates to valves, and more particularly to a valve for opening and closing a flow passageway, and to a sealing ring thereof.

BACKGROUND

A container or bin for storing phosphorous pentasulfide commonly includes a valve for opening and closing a fill/dispense port of the bin. This type of bin is often re-used many times to deliver multiple loads of phosphorous pentasulfide to the same or various customers. The valve is opened at the supplier to install phosphorous pentasulfide in the bin. After the valve is closed, the bin is delivered to the customer. The customer opens the valve to dispense the phosphorous pentasulfide as desired. If possible, the customer closes the valve, and returns the bin empty to the supplier. The bins and their valves are subject to harsh conditions due to the nature of the phosphorous pentasulfide, fluctuations in weather, and rough treatment by some personnel opening and closing the valves. Conventional valves do not last long in the field before requiring maintenance and/or repair. Valves often become jammed and require high torque to close, which can result in hazardous conditions and/or damage to the valve. Phosphorous pentasulfide is generally hazardous and should be well contained. Valve malfunction and valve maintenance can subject workers to undesired exposure to phosphorous pentasulfide. Moreover, ingress of moisture through the valve is undesirable because phosphorous pentasulfide reacts with water to form hydrogen sulfide, sulfur dioxide, and phosphoric acid.

SUMMARY

In one aspect, a sliding gate valve comprises a valve housing, a valve passage, and a gate. The valve passage permits material to pass through the valve housing along a passage axis from an upstream opening of the valve to a downstream opening of the valve. The gate is supported by the valve housing and is movable with respect to the valve passage. The gate has opposite upstream and downstream surfaces. The gate is slidable to a closed position with respect to the valve passage for closing the valve passage and to an open position with respect to the valve passage for opening the valve passage. An upstream sealing ring includes a sealing ring body having a sealing face configured to abut the upstream surface of the gate to form a seal against the upstream surface of the gate when the gate is in the closed position. The upstream sealing ring is configured to permit the gate to slide along the sealing face between the closed and open positions. The upstream sealing ring includes a flow guide protruding radially inward toward the passage axis from the sealing ring body. The flow guide is configured to, when the gate is in the open position, guide material flowing through the valve passage from the upstream opening of the valve to the downstream opening of the valve at a periphery of the valve passage to flow radially inward toward the passage axis. A drive assembly is configured to move the gate to the open and closed positions to open and close the valve passage.

In another aspect, a sliding gate valve comprises a valve housing, a valve passage, and a gate. The valve passage permits material to pass through the valve housing along a passage axis from an upstream opening of the valve to a downstream opening of the valve. The gate is supported by the valve housing and is movable with respect to the valve passage. The gate has opposite upstream and downstream surfaces. The gate is slidable to a closed position with respect to the valve passage for closing the valve passage and to an open position with respect to the valve passage for opening the valve passage. An upstream sealing ring includes a sealing ring body having a sealing face configured to abut the upstream surface of the gate to form a seal against the upstream face of the gate when the gate is in the closed position. The upstream sealing ring is configured to permit the gate to slide along the sealing face between the closed and open positions. A downstream sealing ring has a sealing face configured to abut the downstream surface of the gate to form a seal against the downstream surface of the gate when the gate is in the closed position. The downstream sealing ring is configured to abut the sealing face of the upstream sealing ring when the gate is in the open position. The upstream sealing ring extends radially inward toward the passage axis radially inboard from the downstream sealing ring. A drive assembly is configured to move the gate to the open and closed positions to open and close the valve passage.

In yet another aspect, an upstream sealing ring is for a sliding gate valve having a gate slidable between open and closed positions. The sealing ring comprises a sealing ring body having a sealing face configured to abut an upstream surface of the gate to form a seal against the upstream surface of the gate when the gate is in the closed position. The sealing ring face is configured to permit the gate to slide along the sealing face between the closed and open positions. The upstream sealing ring includes a sealing ring passage for permitting material to pass through the sealing ring along a passage axis of the sealing ring from an upstream opening of the sealing ring to a downstream opening of the sealing ring. The upstream sealing ring includes a flow guide extending radially inward from the sealing ring body. The flow guide includes a flow guide surface defining a side wall of the sealing ring passage. The flow guide surface is configured to guide material flowing through the sealing ring passage from the upstream opening to the downstream opening at a periphery of the sealing ring passage to flow radially inward toward the passage axis.

Other objects and features of the present disclosure will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
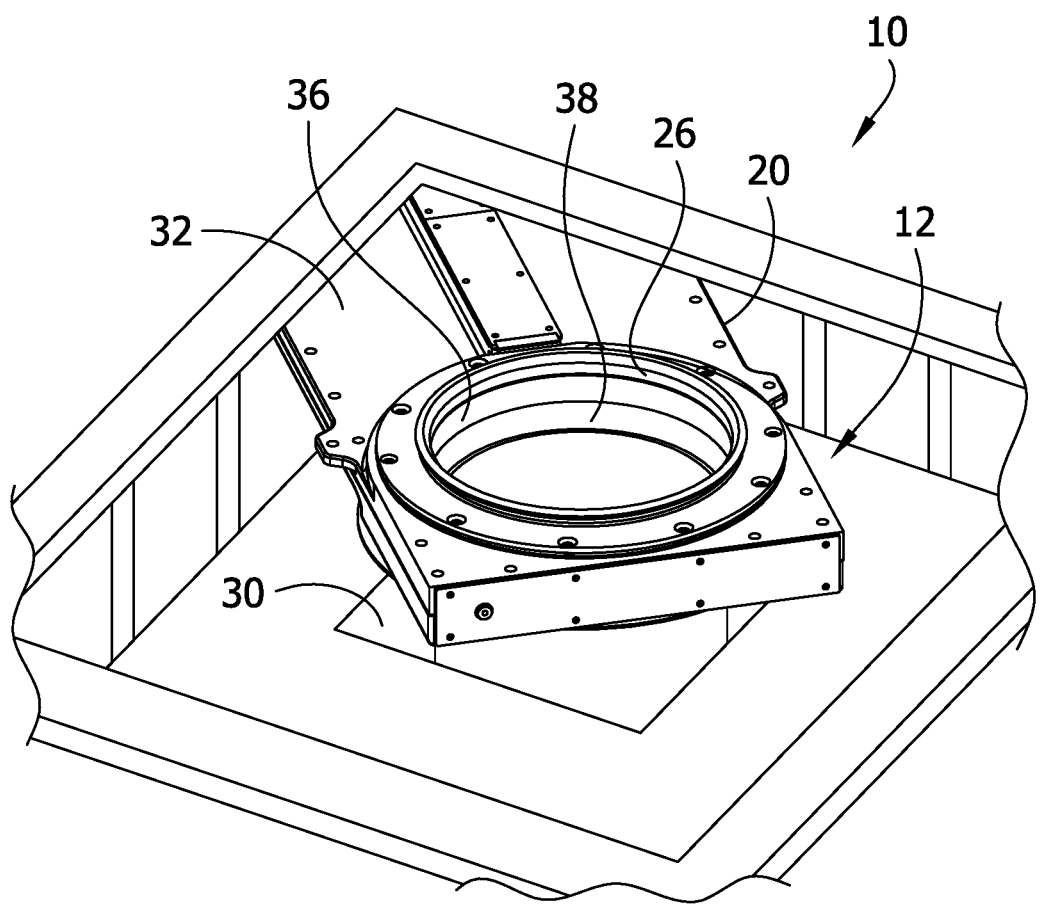
FIG. 1 is a top, front fragmentary perspective of a container embodying aspects of the present invention.
Figure 2:
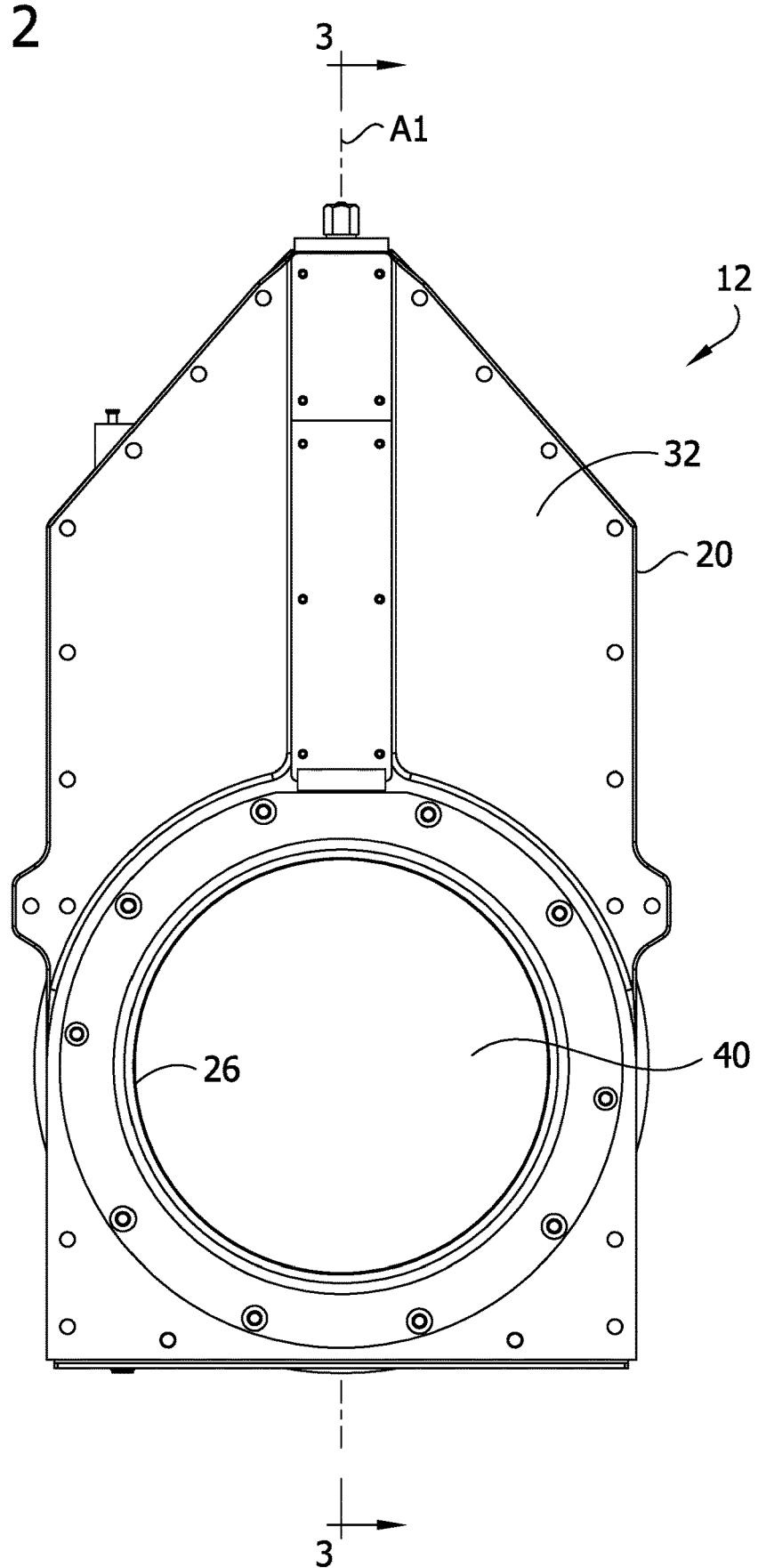
FIG. 2 is a front elevation of a valve of the container.

Referring to FIG. 1, a portion of a bin or container 10 embodying aspects of the present invention is shown including a non-rising stem gate valve (broadly, "valve" or "gate valve") indicated generally by the reference number 12. The bin 10 can be used for storing and/or transporting various materials, such as solids or liquids. In one example, the bin 10 can be used to hold an oil additive known as phosphorous pentasulfide, a crystalline solid powder. It will be appreciated that the bin 10 could be used for other purposes (e.g., carrying other materials). Moreover, the valve 12 could be used on other apparatus, and aspects or components of the valve could be used in other types of valves, without departing from the scope of the present invention.

The valve 12 generally includes a valve housing 20, a gate 22 slidable in the valve housing, and a drive assembly 24 for moving the gate in the valve housing between closed and open positions. The valve housing 20 defines a valve port 26 through which phosphorous pentasulfide can be installed into the bin 10 and/or dispensed from the bin. For example, the bin can be oriented such that the port 26 faces upward for filling the bin 10, and the bin can be oriented such that the port faces downward (container inverted) for emptying the bin. In FIG. 1, the port 26 is facing upward for filling the bin 10. The valve housing 20 is connected to a neck of the bin leading to a body 30 of the bin defining an interior in which product can be stored.

In the illustrated embodiment, the valve housing 20 includes an outer shell 32 and an inner shell 34. The outer and inner shells 32, 34 can be made of cast and/or machined aluminum. Sealing rings 36, 38 are supported by the inner and outer shells 32, 34 to surround a valve passage 39, to seal against the gate 22, and to seal against each other to form a seal to prevent ingress of phosphorous pentasulfide into the valve housing 20 between the sealing rings. When the gate 22 is in the closed position, the gate extends across the valve passage 39 between the sealing rings 36, 38 to close the valve passage. The drive assembly 24 is configured to slide the gate 22 between the sealing rings 36, 38 to open and close the valve passage.

The gate 22 includes a generally flat gate body 40 and a follower 42. The gate body 40 is sized and shaped to slide between the sealing rings 36, 38 and to close the valve passage when the gate 22 is in the closed configuration. The follower 42 is secured to an upper end of the gate body 40 and includes a threaded opening 42A for threaded connection to the drive assembly 24.

Figure 3:
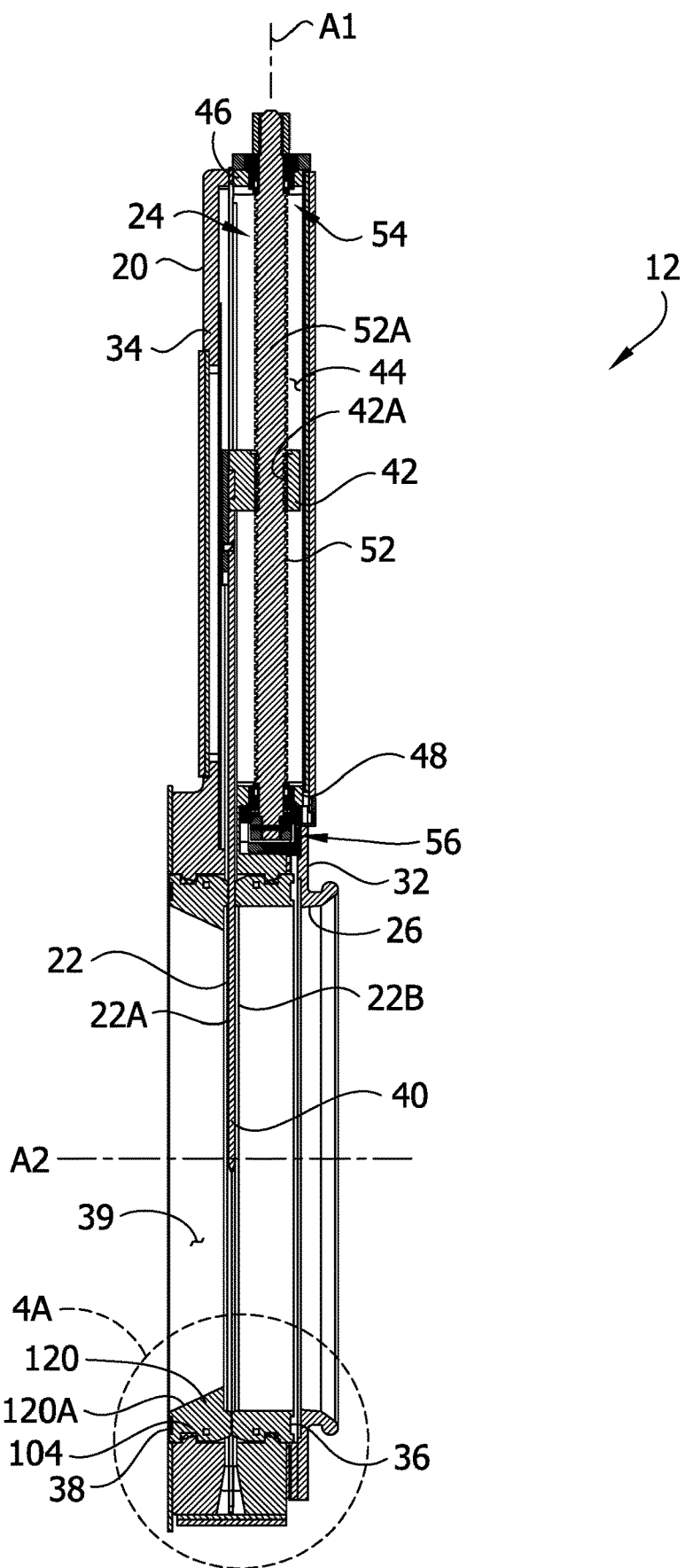
FIG. 3 is a section of the valve taken in a plane including line 3-3 of FIG. 2.

As shown in FIG. 3, the valve housing 20 defines an elongate cavity 44 in which the drive assembly 24 is partially housed and in which the gate follower 42 is movable to open and close the valve passage. The housing 20 includes an upper web 46 at an upper end of the elongate cavity and a lower web 48 at a lower end of the elongate cavity. The drive assembly 24 is mounted to, supported by, and extends between the upper and lower webs 46, 48. The gate follower 42 engages the upper web 46 when the gate is fully raised (open) and engages the lower web 48 when the gate is fully lowered (closed). The gate 22 is shown in a partially open position in FIG. 3, with the follower 42 between the upper and lower webs 46, 48.

Referring to FIG. 3, the drive assembly 24 has a drive end (to the top as viewed in FIG. 3) and a non-drive end (to the bottom as viewed in FIG. 3). When the drive assembly 24 is installed in the housing 20, the drive end extends out of the housing and is exposed outside the housing for actuating the gate valve 12. In particular, a nut 50 threaded onto and welded to a top end of a drive shaft 52 is exposed outside the housing 20 for engagement by a nut setter or other tool. The drive assembly 24 includes a drive-end thrust bearing assembly 54 and a non-drive-end thrust bearing assembly 56 that support respective ends of the drive shaft 52. The drive shaft 52 includes an intermediate portion 52A that has an ACME thread on which the gate follower 42 is threaded. The drive shaft 52 is rotatable about an axis of rotation A1 extending between the thrust bearing assemblies 54, 56. Rotation of the shaft 52 in a first direction (e.g., clockwise) drives the gate follower 42 downward (toward the valve passage), and rotation of the shaft in a second direction (e.g., counter-clockwise) opposite the first direction drives the gate follower upward (away from the valve passage).

Desirably, the gate valve 12 is configured such that the gate 22 is movable toward the open and closed positions by application of rotational force (e.g., to the drive shaft 52 via the top nut 50) of less than 60 ft-lbs, more desirably less than 50 foot-lbs, more desirably less than 40 ft-lbs, and even more desirably less than 30 ft-lbs (e.g., about 25 ft-lbs). In testing of a prototype of the illustrated valve 12, the rotational force required to move the gate was about 17 ft-lbs.

It will be appreciated that other types of drive assemblies can be used for sliding the gate 22 between the open and closed positions without departing from the scope of the present invention.

Figure 4A:
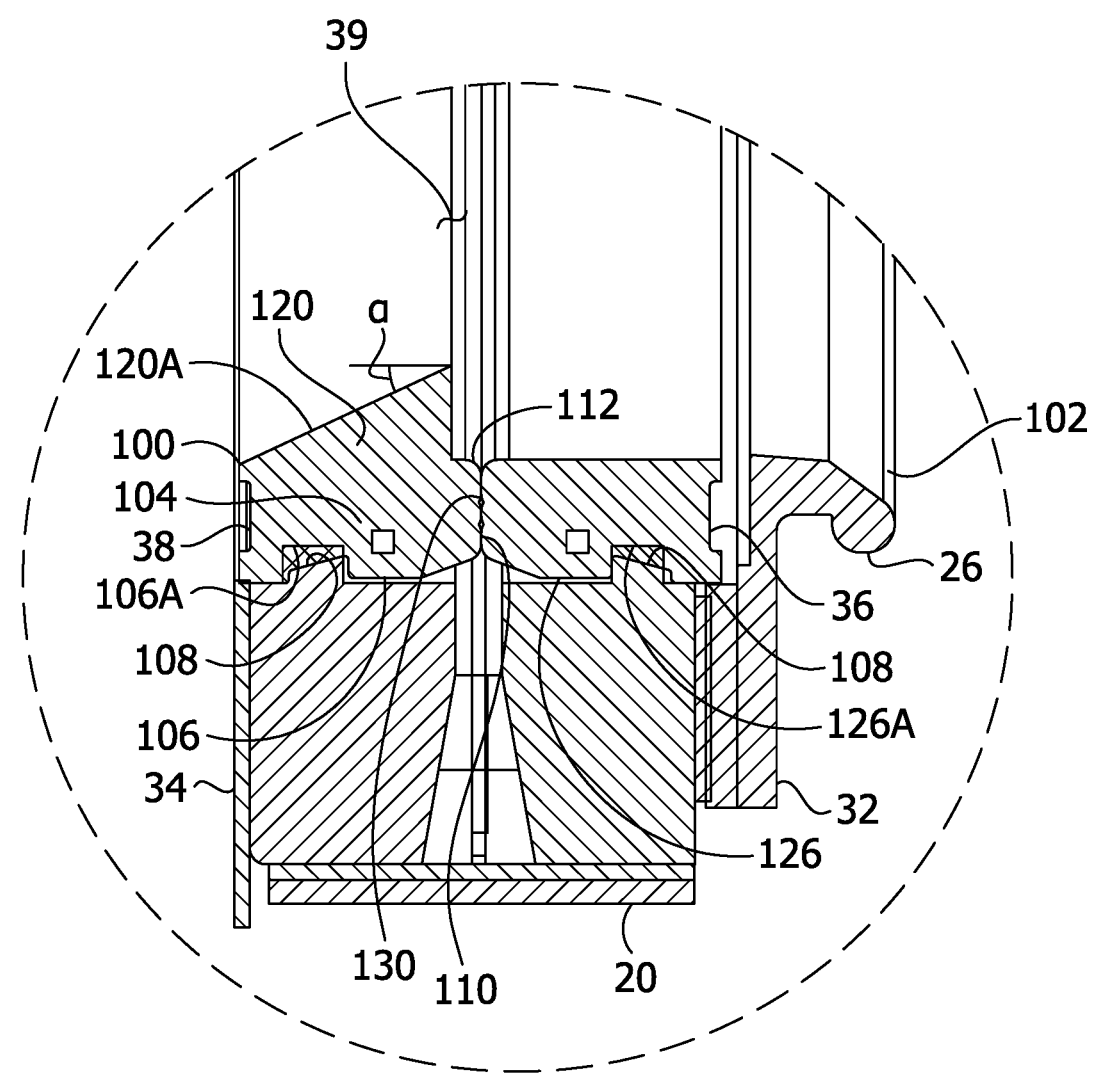
FIG. 4A is an enlarged view of a portion of FIG. 4.
Figure 4B:
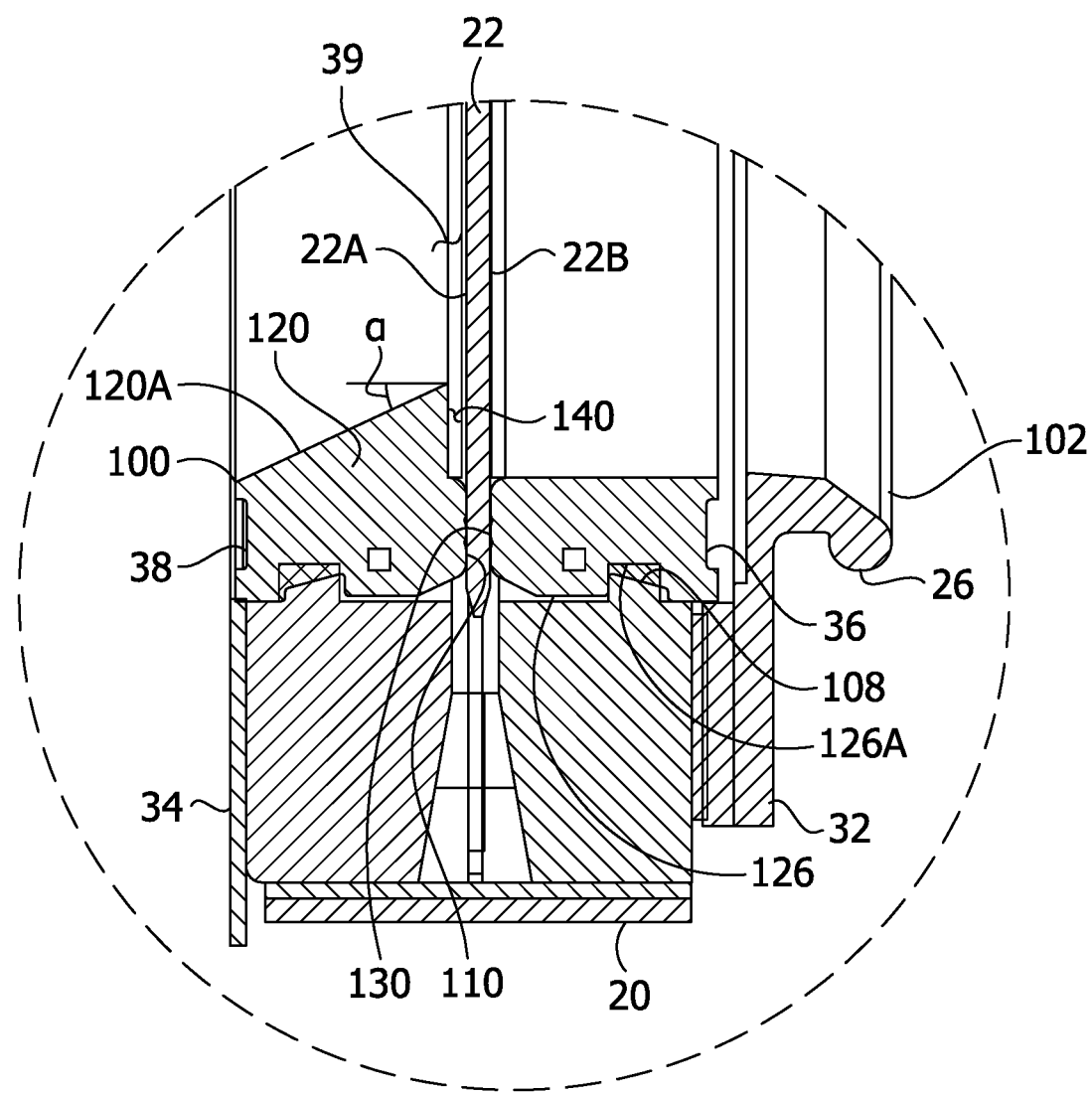
FIG. 4B is a view similar to FIG. 4A but showing a gate of the valve in a closed position.
Figure 5:
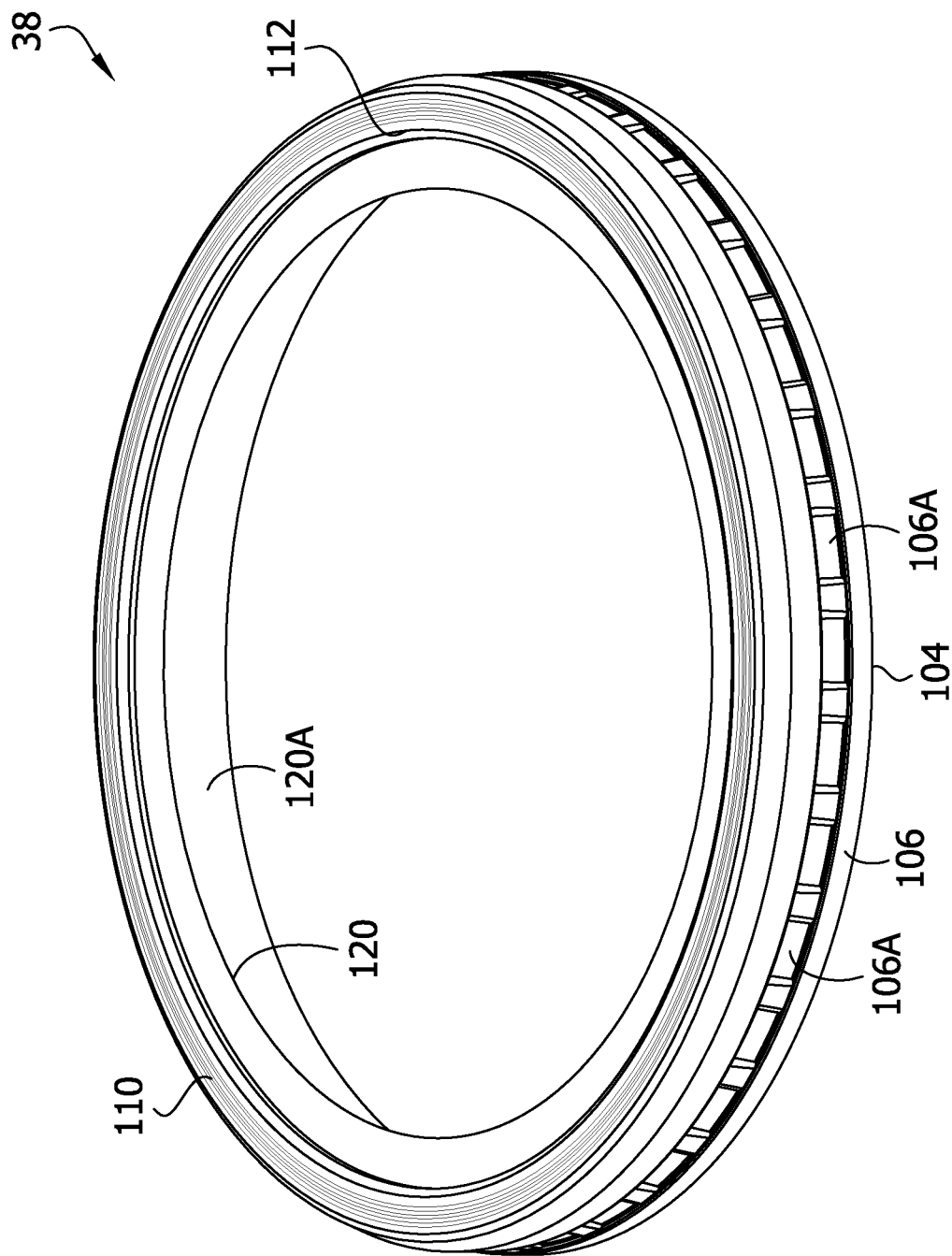
FIG. 5 is a perspective of a sealing ring of the valve.

Referring to FIGS. 3-5, the sealing rings 36, 38 and their cooperation with each other and the gate 22 will be described in further detail. In particular, performance enhancements of the sealing rings 36, 38 for dispensing material from the container 10 will be discussed. Consider the context of the container 10 dispensing material (rather than being filled with material). It will be appreciated that the interior of the container 10 can be referred to as an upstream location from which the material flows downstream through the valve 12 to exit the container. Accordingly, the valve 12 can be referred to as having an upstream opening 100 at an upstream (inner) end of the valve passage 39 in communication with the interior of the container. The valve 12 can also be referred to as having a downstream opening 102 at a downstream (outer) end of the valve passage. The gate 22 has an upstream surface 22A for blocking flow of material from the container interior through the valve passage 39 and has a downstream surface 22B opposite the upstream surface. The sealing ring 38 can be referred to as an upstream sealing ring (upstream from the gate 22), and the sealing ring 36 can be referred to as a downstream sealing ring (downstream from the gate 22). For example, when the container 10 is inverted and the gate 22 is opened, material from the interior of the container flows downstream through the passage 39 along the passage axis A2, through the upstream sealing ring 38, through the downstream sealing ring 36, and finally out of the valve.

The sealing rings 36, 38 are constructed to seal against the gate 22 when the gate is closed, to seal against each other when the gate is open, and to seal against each other and against the gate when the gate is partially open (as shown in FIG. 3). Desirably, the sealing rings 36, 38 prevent material from passing the respective seals into the annular space between the two sealing rings. For example, if material passing through the valve passage 39 were to enter the space between the two sealing rings 36, 38, the material may make closing the gate more difficult or may block or jam the gate from closing when a user attempts to close the gate after emptying the container. Accordingly, it is desirable to prevent material from entering the space between the sealing rings 36, 38.

The sealing rings 36, 38 are constructed to press against each other at locations where the gate 22 is not between the sealing rings to prevent ingress of material between the sealing rings. The upstream sealing ring 38 includes a sealing ring body 104 having an outer circumferential surface 106 supported by the valve housing 20. The outer circumferential surface 106 can include recesses 106A (see FIG. 5) for receiving lugs 108 protruding inward on the inside of the housing 20 to assist in locating the sealing ring 38. The sealing ring body 104 has a generally annular sealing face 110 configured to abut the upstream surface 22A of the gate 22 to form a seal against the upstream surface of the gate. The sealing face 110 is configured to permit the gate 22 to slide along the sealing face between the closed and open positions. As shown in FIG. 5, the sealing face 110 can be ribbed (e.g., include a plurality of protruding annular ribs) to assist in sealing. The upstream sealing ring 38 defines a sealing ring passage (forming part of the valve passage 39) for permitting material to pass through the sealing ring along the passage axis A2 of the valve 12 (coincident with a corresponding passage axis of the sealing ring). The upstream sealing ring 38 has an upstream opening 100 and a downstream opening 112 spaced along the passage axis A2.

The upstream sealing ring 38 also includes a flow guide 120 extending radially inward toward the passage axis A2 from the sealing ring body 104. The construction and function of the flow guide 120 will be described in further detail below.

The downstream sealing ring 36 is similar to the upstream sealing ring 38 but lacks the flow guide. The downstream sealing ring 36 has a sealing ring body 124 similar to the sealing ring body 104 of the upstream sealing ring 38. The downstream sealing ring body 124 has an outer circumferential surface 126 supported by the valve housing 20. The outer circumferential surface 126 can include recesses 126A for receiving lugs 108 protruding inward on the inside of the housing 20 to assist in locating the sealing ring 36. The downstream sealing ring body 124 includes a generally annular sealing face 130 that faces toward the upstream sealing ring 38. The sealing face 130 is configured to abut the downstream surface 22B of the gate 22 to form a seal against the downstream surface of the gate. The sealing face 130 is configured to abut the sealing face 110 of the upstream sealing ring 38 when the gate 22 is open. When the sealing rings 36, 38 press against each other, the sealing faces 110, 130 form an abutting sealing engagement of the two sealing rings. The sealing face 130 can be ribbed such as described above with respect to the sealing face 110 of the upstream sealing ring.

It will be appreciated that sealing rings having shapes other than the illustrated circular shape can be used without departing from the scope of the present invention. For example, the sealing rings could be oval, ob-round, rectangular, etc.

It will be appreciated that various circumstances can affect the performance of the sealing rings 36, 38 in forming the seal between the two sealing rings. Desirably, the sealing rings 36, 38 are formed generally of resiliently compressible material (e.g., EPDM) and are supported in the housing 20 to be compressed in the direction of the passage axis A2. The sealing rings 36, 38 may include rigid reinforcement such as an internal plastic or metal ring, etc. The arrangement is such that the sealing rings 36, 38 press against each other when the gate 22 is open, the sealing rings are further compressed and apart from each other when the gate is moved between them, and the sealing rings relatively quickly expand to resume their pressing sealing engagement when the gate is moved to open the valve passage 39. However, over time, or in cold weather conditions, the sealing rings 36, 38 may be less resilient and not seal against each other as quickly as the gate 22 is moved toward the open position. Moreover, even in favorable conditions, at the location immediately adjacent the tail edge of the opening gate, there may be a slight gap between the sealing rings 36, 38. As a user opens the gate 22 with the container inverted, a majority of the material may exit the valve 12 before the gate is fully open. Accordingly, the gap between the sealing rings 36, 38 following the tail edge of the gate 22 presents a high risk of receiving material (e.g., powder) therein. As explained above, material between the sealing rings 36, 38 can cause the gate to be more difficult to close and may even block or jam the gate to prevent closure.

The flow guide 120 of the upstream sealing ring 38 is constructed to reduce the risk of material entering a gap between the sealing rings 36, 38. In particular, the flow guide 120 is constructed to guide material flowing near a periphery of the valve passage 39 to flow toward the passage axis A2, away from the side wall of the passage and thus away from the potential gap between the sealing rings 36, 38. Not only does the flow guide 120 direct flow away from the potential gap, but the flow guide extends radially inward toward the passage axis A2 sufficiently to be radially inboard of the downstream sealing ring 36, permitting the material to flow freely past the downstream sealing ring without catching on a ledge or shoulder of the downstream sealing ring at the potential gap between the sealing rings.

In the illustrated embodiment, the flow guide 120 comprises a ramp extending circumferentially around the valve passage 39. The ramp 120 protrudes radially inward toward the passage axis A2 from the sealing ring body 104. The ramp 120 includes a flow guide surface 120A defining a side wall of the sealing ring passage. The flow guide surface 120A extends toward the passage axis A2 as the flow guide surface extends toward the downstream sealing ring 36. In the illustrated embodiment, the flow guide surface 120A tapers inward linearly, but curved or other configurations could be used. The angle α at which the flow guide surface slopes inward with respect to the passage axis A2 can be in the inclusive range of 5 to 55 degrees, or 10 to 40 degrees, and in one embodiment about 25 degrees (plus or minus 5 degrees).

Referring to FIG. 4B, it will be appreciated that the flow guide 120 is constructed to not engage the gate 22 to not provide increased frictional resistance to opening the gate. A gap 140 is provided between the gate 22 and the flow guide 120. The valve 12 benefits from the flow diversion provided by the flow guide 120 and does not suffer from increased friction of the gate 22 on the upstream sealing ring 38 which would make opening and closing the gate 22 more difficult.

Bins or containers including gate valves of the type described herein have been tested and been found to provide enhanced performance in preventing material from the container from infiltrating between the sealing rings as the material is dispensed from the container.

It will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A sliding gate valve comprising:
   a valve housing;
   a valve passage for permitting material to pass through the valve housing along a passage axis from an upstream opening of the valve to a downstream opening of the valve;
   a gate supported by the valve housing and movable with respect to the valve passage, the gate having opposite upstream and downstream surfaces and being slidable to a closed position with respect to the valve passage for closing the valve passage and to an open position with respect to the valve passage for opening the valve passage;
   an upstream sealing ring including a sealing ring body having a sealing face configured to abut the upstream surface of the gate to form a seal against the upstream surface of the gate when the gate is in the closed position and being configured to permit the gate to slide along the sealing face between the closed and open positions, the upstream sealing ring including a flow guide protruding radially inward toward the passage axis from the sealing ring body, the flow guide configured to, when the gate is in the open position, guide material flowing through the valve passage from the upstream opening of the valve to the downstream opening of the valve at a periphery of the valve passage to flow radially inward toward the passage axis, the upstream sealing ring including an upstream edge bounding the valve passage at an upstream end of the upstream sealing ring; and
   a drive assembly configured to move the gate to the open and closed positions to open and close the valve passage;
   wherein when the gate is at least partially open, the flow guide, proximate where the sealing face is not abutting the gate to form a seal thereagainst, extends to a portion of the upstream sealing ring closer than the upstream edge to the passage axis to guide material flowing downstream through the valve passage to flow radially inward toward the passage axis.

2. A sliding gate valve as set forth in claim 1, wherein the upstream sealing ring is formed generally of resiliently compressible material.

3. A sliding gate valve as set forth in claim 1, wherein the flow guide includes a flow guide surface extending at least partially around the valve passage, the flow guide surface extending toward the passage axis as the flow guide surface extends toward the downstream opening of the valve.

4. A sliding gate valve as set forth in claim 3, wherein the flow guide surface defines a side wall of the valve passage that extends radially inward as the side wall extends toward the downstream opening.

5. A sliding gate valve as set forth in claim 4, wherein the flow guide surface tapers inward toward the valve passage axis as the side wall extends toward the downstream opening generally at an angle in the inclusive range of 5 degrees to 55 degrees with respect to the valve passage axis.

6. A sliding gate valve as set forth in claim 4, wherein the flow guide surface tapers inward toward the valve passage axis as the side wall extends toward the downstream opening generally at an angle in the inclusive range of 10 degrees to 40 degrees with respect to the valve passage axis.

7. A sliding gate valve as set forth in claim 6, wherein the flow guide surface tapers linearly inward toward the valve passage axis.

8. A sliding gate valve as set forth in claim 3, wherein the flow guide is spaced away from the gate toward the upstream opening from the gate when the gate is in the closed position.

9. A sliding gate valve as set forth in claim 3, wherein the flow guide surface extends toward the passage axis to said portion of the upstream ring closest to the passage axis.

10. A sliding gate valve as set forth in claim 1, further comprising a downstream sealing ring having a sealing face configured to abut the downstream surface of the gate to form a seal against the downstream surface of the gate when the gate is in the closed position and being configured to abut the sealing face of the upstream sealing ring when the gate is in the open position.

11. A sliding gate valve as set forth in claim 10, wherein the flow guide extends radially inward toward the valve passage axis to a portion of the flow guide, the portion of the flow guide being closer than the downstream sealing ring to the passage axis.

12. A container comprising:
    a container body having an interior configured to hold material; and
    a sliding gate valve as set forth in claim 1, the sliding gate valve connected to the container body and configured to permit material to flow from the interior downstream through the valve passage when the gate is in the open position.

13. A sliding gate valve comprising:
    a valve housing;
    a valve passage for permitting material to pass through the valve housing along a passage axis from an upstream opening of the valve to a downstream opening of the valve;
    a gate supported by the valve housing and movable with respect to the valve passage, the gate having opposite upstream and downstream surfaces and being slidable to a closed position with respect to the valve passage for closing the valve passage and to an open position with respect to the valve passage for opening the valve passage;
    an upstream sealing ring including a sealing ring body having a sealing face configured to abut the upstream surface of the gate to form a seal against the upstream face of the gate when the gate is in the closed position and being configured to permit the gate to slide along the sealing face between the closed and open positions;
    a downstream sealing ring having a sealing face configured to abut the downstream surface of the gate to form a seal against the downstream surface of the gate when the gate is in the closed position and being configured to abut the sealing face of the upstream sealing ring when the gate is in the open position, the upstream sealing ring extending radially inward to a portion of the upstream sealing ring bounding the valve passage, said portion of the upstream sealing ring being closer than the downstream sealing ring to the passage axis; and
    a drive assembly configured to move the gate to the open and closed positions to open and close the valve passage.

14. A sliding gate valve as set forth in claim 13, wherein the upstream sealing ring is formed generally of resiliently compressible material.

15. A sliding gate valve as set forth in claim 13, wherein, radially inboard from the generally annular sealing face, the upstream sealing ring is spaced from the upstream surface of the gate when the gate is in the closed position.

16. A sliding gate valve as set forth in claim 13, wherein the upstream sealing ring includes a flow guide surface defining a side wall of the valve passage, the flow guide surface extending toward the passage axis as the flow guide surface extends toward the downstream opening of the valve.

17. A sliding gate valve as set forth in claim 13, wherein the upstream sealing ring extends radially inward to an inward most portion of the upstream sealing ring that is located radially inward from the downstream sealing ring.

18. A sliding gate valve as set forth in claim 17, wherein the upstream sealing ring includes a flow guide surface extending toward the passage axis to the inward most portion as the flow guide surface extends downstream of the upstream opening.

19. An upstream sealing ring for use in a sliding gate valve having a gate slidable in a gate valve housing between open and closed positions, the sealing ring comprising:
- a sealing ring body having a sealing face configured to abut an upstream surface of the gate to form a seal against the upstream surface of the gate when the upstream sealing ring is installed in the gate valve housing and the gate is in the closed position, the sealing ring body being configured to permit the gate to slide along the sealing face between the closed and open positions;
- a sealing ring passage for permitting material to pass through the sealing ring along a passage axis of the sealing ring from an upstream opening of the sealing ring to a downstream opening of the sealing ring when the upstream sealing ring is installed in the gate valve housing;
- a flow guide extending radially inward from the sealing ring body and including a flow guide surface defining a side wall of the sealing ring passage, the flow guide surface, prior to installation of the sealing ring in the valve housing, extending inward toward the passage axis to a portion of the flow guide, the flow guide surface configured to, when the sealing ring is installed in the gate valve housing, guide material flowing downstream through the sealing ring passage to flow radially inward toward the passage axis; and
- an upstream edge bounding the sealing ring passage at an upstream end of the upstream sealing ring, said portion of the flow guide being closer than the upstream edge to the passage axis.

20. An upstream sealing ring as set forth in claim 19, wherein the upstream sealing ring is formed generally of resiliently compressible material.

21. An upstream sealing ring as set forth in claim 19, wherein the flow guide surface extends at least partially around the sealing ring passage, the flow guide surface extending toward the passage axis to said portion of the sealing ring closest to the passage axis as the flow guide surface extends toward the downstream opening.

22. An upstream sealing ring as set forth in claim 19, wherein the side wall of the valve passage defined by the flow guide surface extends radially inward as the side wall extends toward the downstream opening.

23. An upstream sealing ring as set forth in claim 19, wherein the flow guide protrudes radially inward toward the passage axis inboard from the sealing face and is spaced upstream from the sealing face for being spaced from the upstream surface of the gate when the upstream sealing ring is installed in the valve housing and the sealing face is in engagement with the upstream surface of the gate.

* * * * *